(12) United States Patent
Gataric et al.

(10) Patent No.: US 7,307,401 B2
(45) Date of Patent: Dec. 11, 2007

(54) METHOD AND APPARATUS FOR PWM CONTROL OF VOLTAGE SOURCE INVERTER

(75) Inventors: Slobodan Gataric, Indianapolis, IN (US); Brian Welchko, Torrance, CA (US); Steven E. Schulz, Torrance, CA (US); Silva Hiti, Redondo Beach, CA (US); Steve T. West, New Palestine, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/376,915

(22) Filed: Mar. 16, 2006

(65) Prior Publication Data

US 2007/0216341 A1 Sep. 20, 2007

(51) Int. Cl.
*H02P 23/00* (2006.01)
(52) U.S. Cl. .............. 318/807; 318/432; 318/284; 318/138; 318/439; 318/254; 318/811
(58) Field of Classification Search .......... 318/807, 318/432, 284, 138, 439, 254, 599, 629, 437, 318/811, 569, 567, 600; 363/41, 36; 388/804, 388/811
See application file for complete search history.

(56) References Cited

U.S. PATENT DOCUMENTS

| | | | | |
|---|---|---|---|---|
| 5,486,747 A | * | 1/1996 | Welch | 318/811 |
| 6,005,783 A | * | 12/1999 | Xue et al. | 363/36 |
| 6,426,602 B1 | * | 7/2002 | McCann et al. | 318/432 |
| 6,643,149 B2 | * | 11/2003 | Arnet et al. | 363/41 |
| 2005/0024902 A1 | * | 2/2005 | Hiti et al. | 363/37 |

* cited by examiner

*Primary Examiner*—Karen Masih

(57) ABSTRACT

PWM methods and apparatus are provided for loss minimized control of AC motors taking into consideration inverter non-linear limitations. The method comprises providing a voltage to the AC motor based on a switching cycle, adding a duty cycle of a zero vector to each phase leg of the switching cycle when a duty cycle of a first phase leg of the switching cycle is less than a minimum duty cycle, and subtracting the duty cycle of the zero vector from each phase leg of the switching cycle when a second duty cycle of a second phase leg is greater than a maximum duty cycle. The minimum duty cycle and maximum duty cycle indicate distortion regions.

20 Claims, 3 Drawing Sheets

METHOD AND APPARATUS FOR PWM CONTROL OF VOLTAGE SOURCE INVERTER

TECHNICAL FIELD

The present invention generally relates to controlling alternating current (AC) motors, and more particularly relates to apparatus and methods for controlling the torque output of sinusoidally wound AC motors.

BACKGROUND OF THE INVENTION

AC motors are used in a variety of applications, including vehicle applications such as traction control. The AC motors used in vehicle applications are typically controlled via a voltage source inverter. Discontinuous Pulse Width Modulation (DPWM) methods are commonly employed in inverter controllers to control the fundamental output voltage component of three-phase voltage source inverters. These three-phase voltage source inverters may in turn be used to control the phase currents of three-phase AC motors. DPWM methods reduce inverter losses in comparison with continuous Pulse Width Modulation (PWM) methods, such as sinusoidal or space vector modulation.

DPWM methods generally differ from continuous PWM methods in that DWPM methods use a single zero vector in a given switching cycle of the three phase voltage source inverter. Additionally, in DWPM methods, each switch in the three phase voltage source inverter is typically not switched, or clamped, for sixty degree (60°) segments of an electrical cycle. The location of the sixty degree (60°) clamped segment with respect to the output voltage of the three phase voltage source inverter and the load power factor generally determines the type of DPWM method and resulting PWM properties. For example, when the clamped segment is located such that losses are optimized for a thirty degree (30°) leading power factor load, the DPWM method is referred to as DPWM0. DPWM1 refers to when the clamped segment is located to optimize switching losses for a unity power factor load, and DPWM2 refers to when the clamped segment is located to optimize switching losses for a thirty degree (30°) lagging power factor load.

Most DPWM methods used with voltage source inverters are susceptible to voltage distortion due to practical limitations of the voltage source inverter, such as inverter lockout time, or dead time, and minimum pulse width constraints. These practical limitations are typically non-linear effects that manifest as finite and controllable minimum and maximum pulse widths. Either inverter switch, for a phase leg, of the voltage source inverter can be indefinitely held "ON" to create discrete values of pulse widths with duty cycles of zero and one, respectively. During some operating conditions, the commanded duty cycles for a particular phase leg have a pulse width between the minimum and maximum achievable pulse widths and the corresponding discrete values of zero and one. The non-linear effects produce unachievable regions (e.g., between the minimum and maximum achievable pulse widths and the corresponding discrete values of zero and one) that occur for each phase of the voltage source inverter.

Accordingly, it is desirable to provide a method for minimizing inverter switching losses when operating a three phase AC motor. In addition, it is desirable to provide a voltage source inverter having minimized switching losses for controlling an AC motor. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Methods and apparatus are provided for controlling an AC motor while minimizing losses from inverter non-linear limitations. The method comprises providing a voltage to the AC motor based on a switching cycle and an output voltage vector, and modifying a duty cycle of each of a plurality of phase legs of the switching cycle by a duty cycle of a zero vector of the switching cycle when the output voltage vector is in a distortion region.

In another exemplary embodiment, a voltage source inverter is provided for controlling an AC motor. The voltage source inverter comprises a controller having an input and an output, a switch network having an input coupled to the output of the controller and having an output configured to couple to the AC motor, and a modulator having an input coupled to the output of the inverter circuit and having an output coupled to said input of the controller. The controller is configured to produce a first signal. The switch network is configured to produce an output voltage vector and a zero vector based on the first signal and provide a voltage to the AC motor corresponding to the output voltage vector. The modulator is configured to modify the zero vector when the output voltage vector is in a distortion region based on the switch network.

In another exemplary embodiment, a method for controlling a voltage source inverter is provided comprising monitoring an output voltage vector of the voltage source inverter, producing a modified switching cycle by modifying a duty cycle of each of a plurality of phase legs of a switching cycle by a duty cycle of a zero vector of the switching cycle when the output voltage vector is in a distortion region, and providing a DPWM signal to the voltage source inverter. The DPWM signal has the modified switching cycle.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
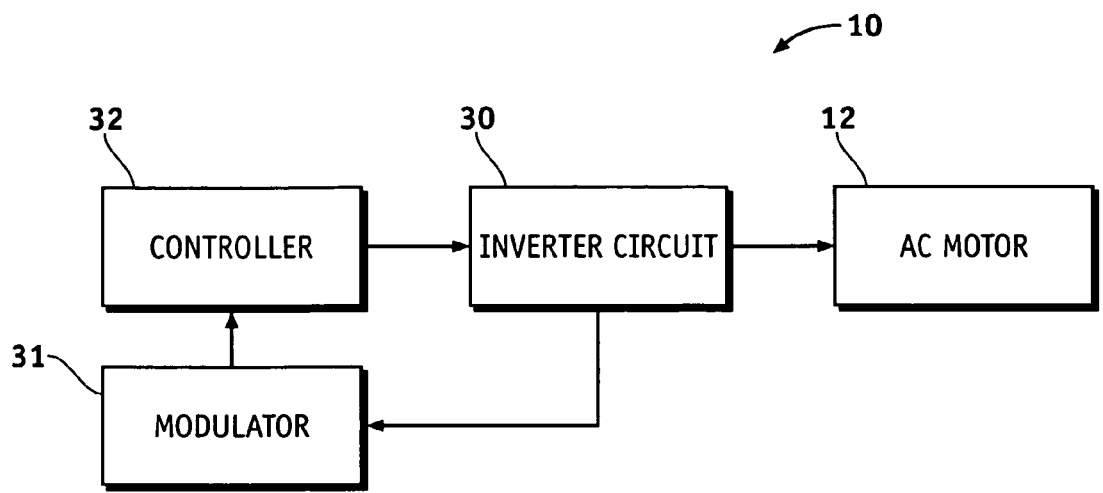
FIG. 1 is a block diagram of a voltage source inverter system in accordance with an exemplary embodiment of the present invention.

Referring to FIG. 1, a voltage source inverter system 10 is shown in accordance with an exemplary embodiment of the present invention. The voltage source inverter system 10 comprises a controller 32, an inverter circuit 30 coupled to an output of the controller 32, an alternating current (AC) motor 12 coupled to a first output of the inverter circuit 30, and a modulator 31 having an input coupled to a second output of the inverter circuit 30 and having an output coupled to an input of the controller 32. Generally, the controller 32 produces a Pulse Width Modulation (PWM) signal for controlling the switching action of the inverter circuit 30. In a preferred embodiment, the controller 32 preferably produces a discontinuous PWM (DPWM) signal having a single zero vector associated with each switching cycle of the inverter circuit 30. The inverter circuit 30 then converts the PWM signal to a modulated voltage waveform for operating the AC motor 12. The AC motor 12 is a sinusoidally-wound AC motor (e.g., permanent magnet or induction) such as commonly used in automotive vehicles (e.g., traction drive control systems, and the like).

To optimize the operation of the AC motor 12, the modulator 31 monitors the modulated voltage waveform produced by the inverter circuit 30 and determines when the switching of the inverter circuit 30 is operating in a distortion region that is based on non-linear limitations (e.g., minimum pulse width and dead time) associated with the inverter circuit 30. When the inverter circuit 30 is operating in the distortion region, the modulator 31 instructs the controller 32 to transmit a modified DPWM signal that compensates for the distortion region (e.g., by varying a duty cycle for each phase leg of the switching cycle).

Figure 2:
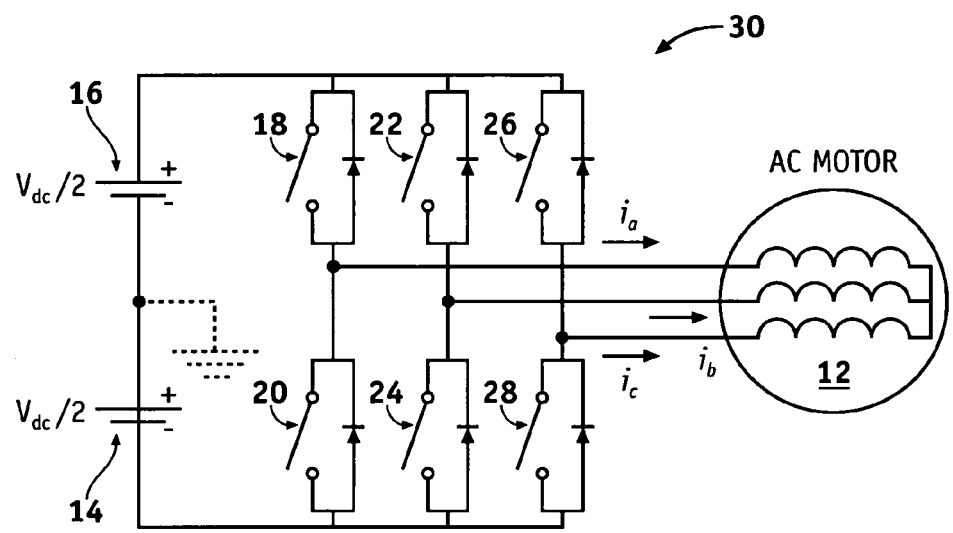
FIG. 2 is a schematic diagram of the inverter circuit shown in FIG. 1.

FIG. 2 is the inverter circuit 30 of FIG. 1 in greater detail. The inverter circuit 30 is a three-phase circuit coupled to the AC motor 12. More specifically, the inverter circuit 30 comprises voltage sources (14, 16) and a switch network having a first input coupled to the voltage sources (14, 16) and an output configured to couple to the AC motor 12. Although voltages sources (14, 16) are shown as a distributed DC link with two series sources, a single voltage source may be used.

The switch network comprises three pairs of series switches with antiparallel diodes (i.e., antiparallel to each switch) corresponding to each of the phases. Each of the pairs of series switches comprises a first switch (18, 22, 26) having a first terminal coupled to a positive electrode of the voltage source (14, 16) and a second switch (20, 24, 28) having a second terminal coupled to a negative electrode of the voltage source (14, 16) and having a first terminal coupled to a second terminal of the first switch (18, 22, 26), respectively. To monitor the switching cycle and output voltage vector of the inverter circuit 30, the modulator 31 is coupled to the output of the inverter circuit 30.

Figure 3:
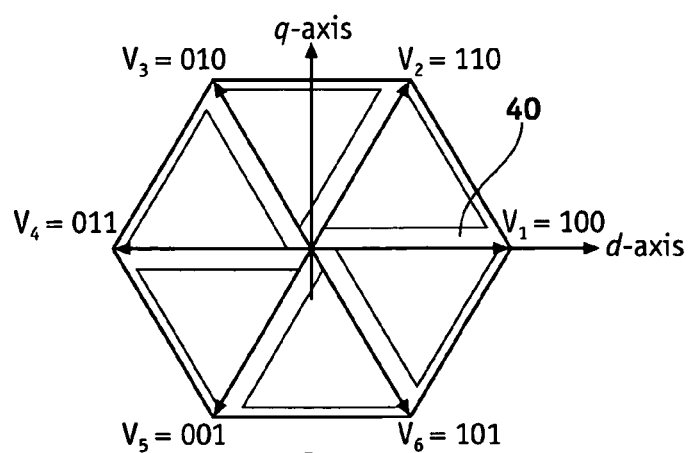
FIGS. 3-5 are graphs of inverter output voltage having distortion regions useful in understanding the voltage source inverter system shown in FIG. 1.
Figure 4:
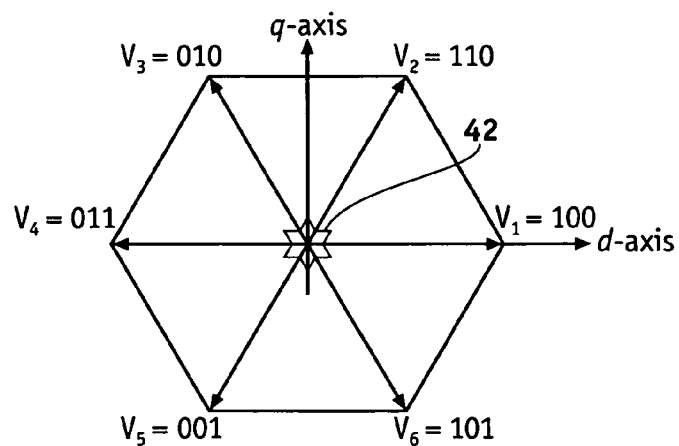
Figure 5:
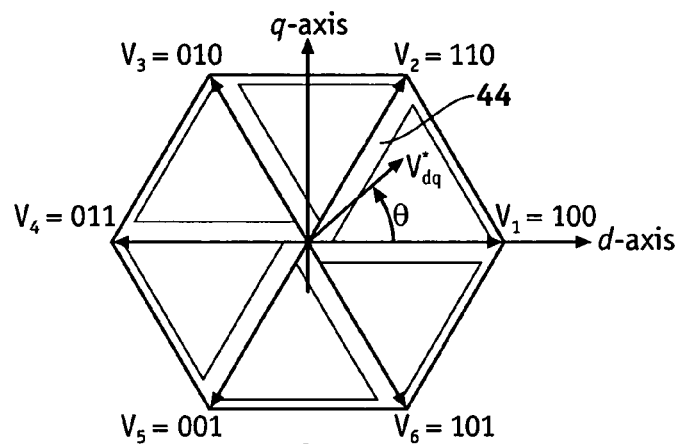

FIGS. 3-5 are graphs of inverter output voltages having distortion regions, shown in grey, useful in understanding the voltage source inverter system shown in FIG. 1. The inverter output voltages are represented by vectors (e.g., $V_1$, $V_2$, $V_3$, $V_4$, $V_5$, and $V_6$) corresponding to the switching for each phase (e.g., each of three phases) of the switching cycle. Each of the phases has two (2) states (e.g., corresponding to discrete one and zero). For example, referring to FIGS. 2-5, $V_1$ is the voltage vector corresponding to a discrete one state of the first pair of switches 18, 20 and a discrete zero state of each of the second and third pairs of switches 22, 24 and 26, 28, $V_2$ is the voltage vector corresponding to a discrete one state of each of the first and second pairs of switches 18, 20 and 22, 24 and a discrete zero state of the third pairs of switches 26, 28, $V_3$ is the voltage vector corresponding to a discrete zero state of each of the first and third pairs of switches 18, 20 and 26, 28 and a discrete one state of the second pair of switches 22, 24, $V_4$ is the voltage vector corresponding to a discrete zero state of the first pair of switches 18, 20 and a discrete one state of each of the second and third pairs of switches 22, 24 and 26, 28, $V_5$ is the voltage vector corresponding to a discrete zero state of each of the first and second pairs of switches 22, 24 and 26, 28 and a discrete one state of the third pair of switches, and $V_6$ is the voltage vector corresponding to a discrete one state of each of the first and third pairs of switches 18, 20 and 26, 28 and a discrete zero state of the second pair of switches 22, 24. A zero vector (e.g., at the center of the graphs) corresponds to either a discrete one state for each of the pairs of switches 18, 20, 22, 24, and 26, 28 or a discrete zero state for each of the pairs of switches 18, 20, 2, 24, and 26, 28.

A distortion region 40 associated with the thirty degree (30°) leading power factor load of DPWM0 is shown in FIG. 3, a distortion region 42 associated with the unity power factor load of DPWM1 is shown in FIG. 4, and a distortion region associated with the thirty degree (30°) lagging power factor load associated with DPWM2 is shown in FIG. 5. Under all operating conditions, the switching network is subject to minimum pulse width limits and dead time limitations which are non-linear limitations represented by the distortion regions. Because the inverter limitations of minimum pulse width and dead time are fixed time values, the angular width ($\theta$) or span of the distortion region, as best shown in FIGS. 3 and 5, vary with the modulation depth of the output voltage and the switching frequency of the switching network.

The switches 18, 20, 22, 24, 26, and 28 may be activated (e.g., closed) based on a modified generalized DPWM (GDPWM) method such that the clamped segment is adjusted depending upon the power factor or other condition. In general, the GDPWM method is preferable for hybrid vehicle applications because inverter losses can be decreased over continuous PWM methods. Due to the ease of modulating the zero vector, GDPWM can be configured for any operating condition. However, with GDPWM, the distortion regions are rotated by angular offset from the sector transitions, and thus the distortion regions for GDPWM continuously change. By proper control of the output pulses of the DPWM signal from the controller 32 as modified by the modulator 31, the effects of these non-linearities (represented by the distortion regions) are compensated. With GDPWM, the modulator 31 selects an appropriate zero vector based upon the maximum phase current whose angle varies with load power factor.

Figure 6:
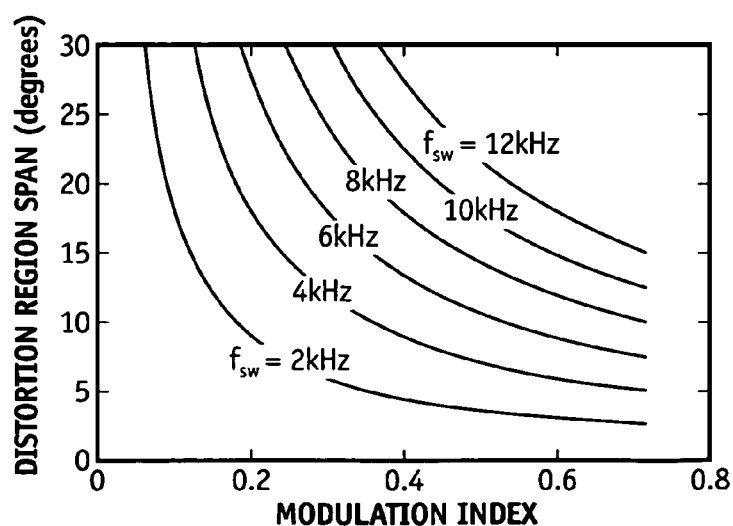
FIG. 6 is a graph of multiple distortion spans useful in understanding the voltage source inverter system shown in FIG. 1.

FIG. 6 is a graph of multiple distortion spans useful in understanding the voltage source inverter system shown in FIG. 1. The distortion spans vary based on the switching frequency (e.g., 2 kHz, 4 kHz, 6 kHz, 8 kHz, 10 kHz, and 12 kHz) and a modulation index. Because the distortion span varies with switching frequency, switching the zero vector depending solely upon the spatial location of the commanded voltage vector (e.g., in the space vector diagram shown in FIGS. 3-5) may not be practical because the distortion regions continuously change when using GDPWM. The modified GDPWM method selects the zero vector when the output voltage vector is in a distortion region by operating on the phase duty cycle commands directly.

Figure 7:
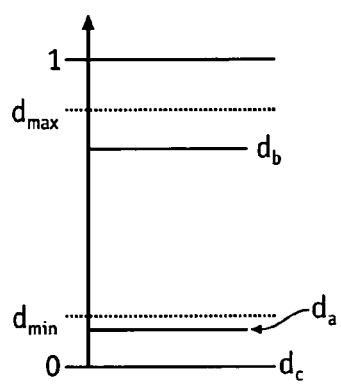
FIGS. 7-10 are phase duty cycles useful in understanding the voltage source inverter system shown in FIG. 1.
Figure 8:
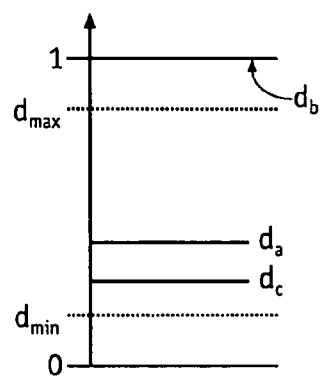

FIGS. 7-10 are phase duty cycles useful in understanding the voltage source inverter system shown in FIG. 1. FIG. 7 shows the phase duty cycles ($d_a$, $d_b$, and $d_c$) for a switching cycle. Phase duty cycle $d_a$ is in a distortion region between the minimum duty cycle, $d_{min}$, and discrete zero while phase duty cycle $d_c$ is at discrete zero and phase duty cycle $d_b$ is between $d_{min}$ and the maximum duty cycle, $d_{max}$. FIG. 8 shows the phase duty cycles ($d_a$, $d_b$, and $d_c$) after the duty cycle of the zero vector is added to the duty cycles of each of the phase legs of the switching cycle shown in FIG. 7. In FIG. 8, phase duty cycles $d_a$ and $d_c$ are now between $d_{min}$ and $d_{max}$ and $d_b$ is now at discrete one. By adding the duty cycle of the zero vector to the duty cycles of each phase leg in the switching cycle when the output voltage vector is in the distortion region between $d_{min}$ and discrete zero, this distortion region is compensated by the voltage source inverter system 10.

Figure 9:
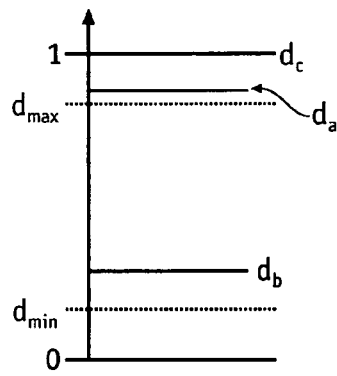
Figure 10:
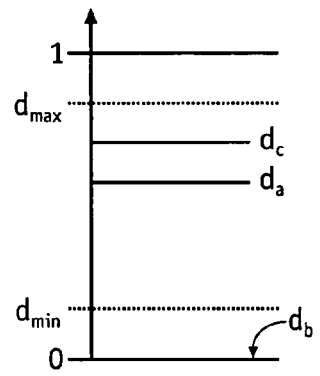

FIG. 9 shows the phase duty cycles ($d_a$, $d_b$, and $d_c$) for another switching cycle. Phase duty cycle $d_a$ is in a distortion region between the $d_{max}$ and discrete one while phase duty cycle $d_c$ is at discrete one and phase duty cycle $d_b$ is between $d_{min}$ and the maximum duty cycle, $d_{max}$. FIG. 10 shows the phase duty cycles ($d_a$, $d_b$, and $d_c$) after the duty cycle of the zero vector is subtracted from the duty cycles of each of the phase legs of the switching cycle shown in FIG. 9. In FIG. 10, phase duty cycles $d_a$ and $d_c$ are now between $d_{min}$ and $d_{max}$ and $d_b$ is now at discrete zero. By subtracting the duty cycle of the zero vector from the duty cycles of each phase leg in the switching cycle when the output voltage vector is in the distortion region between $d_{min}$ and discrete zero, this distortion region is compensated by the voltage source inverter system 10.

Referring back to FIG. 1, in an exemplary embodiment, the modulator 31 transmits a control signal or modulation signal to the controller 32 when the output voltage vector is in the distortion region. This control signal or modulation signal changes the DPWM signal by changing duty cycle of each of the phase legs in the switching cycle by a duty cycle of the zero vector. For example, when a phase leg of the switching cycle is less than $d_{min}$ (and not discrete zero), the modulator 31 adds the duty cycle of the zero vector to each of the phase legs in the switching cycle, and when a phase leg of the switching cycle is greater than $d_{max}$ (and not discrete one), the modulator 31 subtracts the duty cycle of the zero vector from each of the phase legs in the switching cycle. The controller 32 transmits the modified DPWM signal to the inverter circuit 30.

Figure 11:
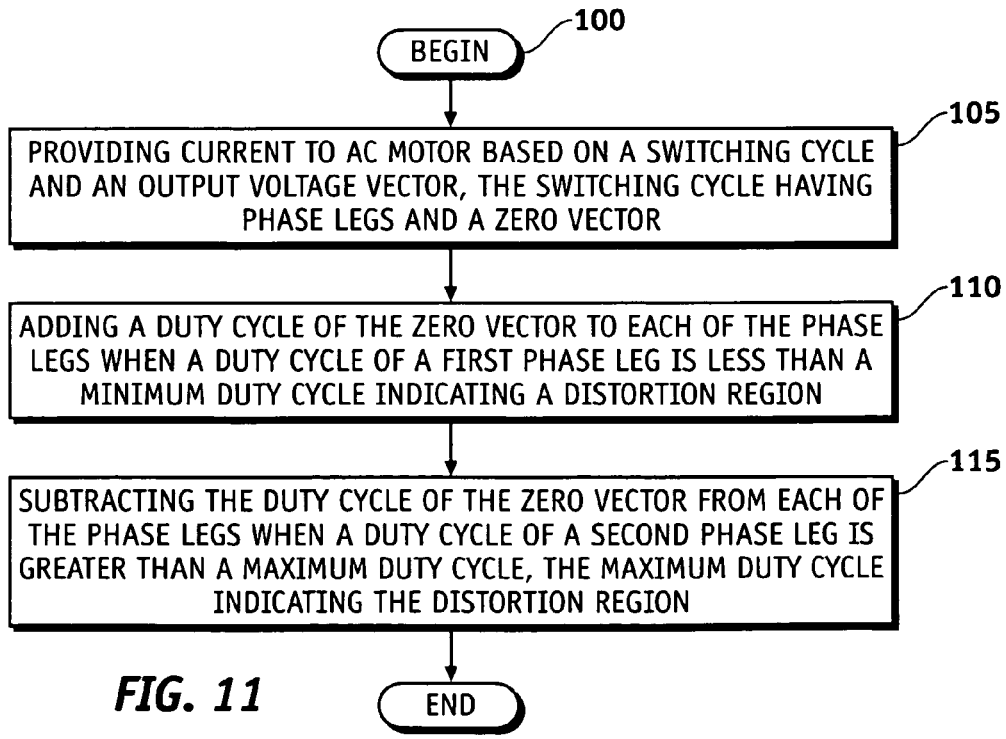
FIG. 11 is a flow diagram of a method for controlling an AC motor in accordance with an exemplary embodiment of the present invention.

FIG. 11 is a flow diagram of a method for controlling an AC motor in accordance with an exemplary embodiment of the present invention. The method begins at step 100. A voltage is provided to the AC motor based on a switching cycle and an output voltage vector at step 105. The switching cycle has a plurality of phase legs and has a zero vector. A duty cycle of each of the plurality of phase legs is modified by a duty cycle of the zero vector when the output voltage vector is in a distortion region at step 110. When a duty cycle of a first phase leg of the switching cycle is less than a minimum duty cycle, a duty cycle of the zero vector is added to each of the plurality of phase legs. The minimum duty cycle indicates the distortion region. When a duty cycle of a second phase leg is greater than a maximum duty cycle, the duty cycle of the zero vector is subtracted from each of the plurality of phase legs. The maximum duty cycle indicates the distortion region While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling an alternating current (AC) motor, comprising:
   providing a voltage to the AC motor based on a switching cycle and an output voltage vector, the switching cycle having a plurality of phase legs and having a zero vector; and
   modifying a duty cycle of each of the plurality of phase legs by a duty cycle of the zero vector when the output voltage vector is in a distortion region.

2. A method according to claim 1, wherein said step of modifying comprises adding a duty cycle of the zero vector to each of the plurality of phase legs when a duty cycle of a first phase leg of the switching cycle is less than a minimum duty cycle, the minimum duty cycle indicating the distortion region.

3. A method according to claim 1, wherein said step of modifying comprises subtracting the duty cycle of the zero vector from each of the plurality of phase legs when a duty cycle of a second phase leg is greater than a maximum duty cycle, the maximum duty cycle indicating the distortion region.

4. A method according to claim 1 wherein said step of providing a voltage comprises driving the AC motor with an inverter.

5. A method according to claim 4, wherein said step of providing a voltage comprises driving the inverter with a discontinuous pulse width modulation (DPWM) signal.

6. A method according to claim 4, wherein the minimum duty cycle and the maximum duty cycle are based on at least one of a minimum pulse width of the inverter and a dead time of the inverter.

7. A method according to claim 4, wherein said step of providing a voltage comprises selecting the zero vector based on a maximum phase current, the maximum phase current having a phase angle varying with a load power factor of the inverter.

8. A voltage source inverter for controlling an AC motor, the voltage source inverter comprising:
   a controller having an input and an output, said controller configured to produce a first signal;
   a switch network having an input coupled to said output of said controller and having an output configured to couple to the AC motor, said switch network configured to:
   produce an output voltage vector and a zero vector based on said first signal; and
   provide a voltage to the AC motor corresponding to said output voltage vector; and a modulator having an input coupled to said output of said inverter circuit and having an output coupled to said input of said controller, said modulator configured to modify said zero vector when said output voltage vector is in a distortion region, said distortion region based on said switch network.

9. A voltage source inverter according to claim 8, wherein said first signal is a DPWM signal.

10. A voltage source inverter according to claim 8, wherein said modulator is further configured to provide a second signal to said controller when said output voltage vector is in said distortion region, said second signal based on said output voltage vector and said zero vector.

11. A voltage source inverter according to claim 8, wherein said first signal has a switching cycle, said switching cycle having a plurality of phase legs, each of said plurality of phase legs having a duty cycle; and wherein said controller is further configured to modify said duty cycle for each of said plurality of phase legs when said output voltage vector is in said distortion region.

12. A voltage source inverter according to claim 11, wherein said controller is further configured to add a duty cycle of said zero vector to each of said plurality of phase legs when a duty cycle of one of said plurality of phase legs is less than a minimum duty cycle, said minimum duty cycle indicating said distortion region.

13. A voltage source inverter according to claim 12, wherein said minimum duty cycle is based on at least one of a minimum pulse width of said switching network and a dead time of said switching network.

14. A voltage source inverter according to claim 11, wherein in response to said second signal said controller is further configured to subtract a duty cycle of said zero vector from each of said plurality of phase legs when a duty cycle of one of said plurality of phase legs is greater than a maximum duty cycle, said maximum duty cycle indicating said distortion region.

15. A voltage source inverter according to claim 14, wherein said maximum duty cycle is based on at least one of a minimum pulse width of said switching network and a dead time of said switching network.

16. A voltage source inverter according to claim 8, wherein said distortion region is based on at least one of a minimum pulse width of said switching network and a dead time of said switching network.

17. A method for controlling a voltage source inverter, the method comprising:

monitoring an output voltage vector of the voltage source inverter, the output voltage vector based on a switching cycle, the switching cycle having a plurality of phase legs and a zero vector;

producing a modified switching cycle by modifying a duty cycle of each of the plurality of phase legs by a duty cycle of the zero vector when the output voltage vector is in a distortion region; and providing a DPWM signal to the voltage source inverter, the DPWM signal having the modified switching cycle.

18. A method according to claim 17, wherein said step of producing a modified switching cycle comprises adding a duty cycle of the zero vector to each phase leg of the switching cycle when a duty cycle of a first phase leg of the switching cycle is less than a minimum duty cycle, the minimum duty cycle indicating the distortion region.

19. A method according to claim 17, wherein said step of modifying comprises subtracting the duty cycle of the zero vector from each phase leg of the switching cycle when a second duty cycle of a second phase leg is greater than a maximum duty cycle, the maximum duty cycle indicating the distortion region.

20. A method according to claim 17, wherein the distortion region is based on at least one of a minimum pulse width of the voltage source inverter and a dead time of voltage source inverter.

* * * * *